H. W. WINANS.
Packing for Stuffing-Boxes, &c.
No. 218,804.  Patented Aug. 19, 1879.
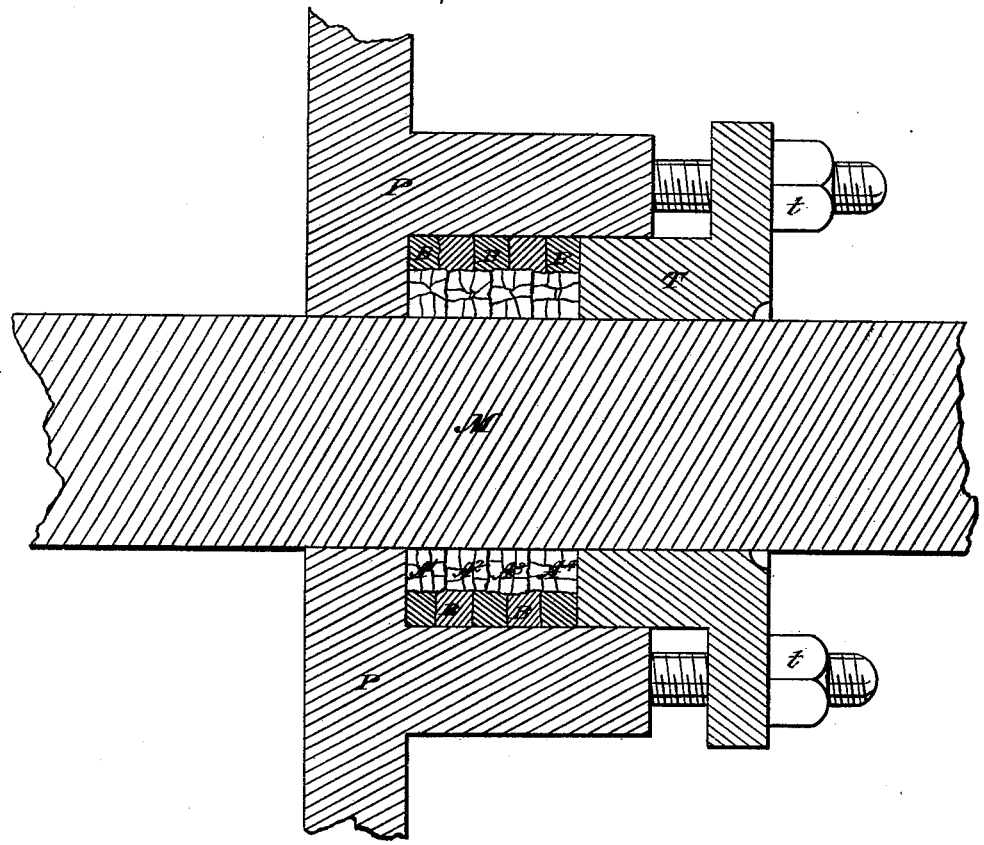
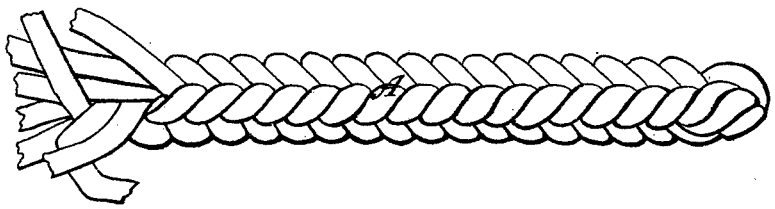

UNITED STATES PATENT OFFICE.

HERMAN W. WINANS, OF NEW YORK, N. Y.

IMPROVEMENT IN PACKINGS FOR STUFFING-BOXES, &c.

Specification forming part of Letters Patent No. 218,804, dated August 19, 1879; application filed April 16, 1879.

*To all whom it may concern:*

Be it known that I, HERMAN W. WINANS, of New York city, in the State of New York, have invented certain new and useful Improvements in Packing, of which the following is a specification.

My improved packing is adapted for stuffing-boxes and analogous devices for use with steam, water, or other fluids. I will describe it as applied around a piston-rod.

It has long been common to employ packing of rubber covered with hemp, braided on and filled with grease and plumbago. Such forms a packing of round section, which, in time, assumes the form of the cavity in which it is compressed. I employ cotton similarly filled. I omit the rubber, or employ so little that it is of little or no importance. I fill the packing with lubricating material, and find it both wears longer and works smoother, and apparently with less friction. I make it of square section. It is braided from soft spun cotton.

My experiments have been made with packing braided by hand; but I propose to employ machines. I use it in connection with an outer ring of harder and more elastic packing, which, on compression, forces it constantly against the piston-rod. Its dimensions should be equal to the thickness of the annular space between the other packing and the piston-rod. The compression of the gland tends simply to contract its dimensions in one direction; but the same force acting on the other more resilient packing dilates the entire mass radially, and compels it to bear fairly against the piston-rod. Its rectangular form causes it to fill the space in the stuffing-box entirely so soon as it is placed in position and the gland screwed down. No time is lost in changing a round section to a rectangular or other section. It is solid from the first.

The following is a description of what I consider the best means of carrying out the invention.

The accompanying drawings form a part of this specification.

Figure 1 is a central longitudinal section through the stuffing-box with the packing in position for use. Fig. 2 represents a short length of the packing as it is manufactured.

Similar letters of reference indicate like parts in both the figures.

M is the piston-rod. P is the body of the cylinder-head, and T is the gland, held down by bolts $t$.

Around the exterior of the stuffing-box I place rings B, which are of soft vulcanized rubber, thickly covered with cotton, braided on. These are of rectangular section and about half fill the space exterior to the piston-rod.

A' is the packing of soft cotton, fitted concentrically within the other. It is a braid of rectangular section. It is made of soft spun cotton, with its interstices filled with plumbago and tallow. The square braid A' is cut off in proper lengths, and coiled around in the stuffing-box, so as to fill the entire space within the outer material, B, and to hug closely the piston-rod M.

A sufficient number of the rings of packing A' are employed to apply against the whole surface of the piston-rod within the stuffing-box.

When both sets of packing-rings A' and B are in place, the cotton saturated with the black-lead and grease lies on the inside of the annular space around the piston-rod, and the rings B, which are principally or entirely of rubber, lie on the outside of the annular space. When the gland T is forced down by setting up the bolts $t$, it compresses alike the rubber material B and the soft packing A'. The soft packing A' is simply compressed; but the rubber packing B is swelled inward by the descent of the gland, and forces the other (the packing A') into tighter and tighter contact with the piston-rod as the bolts $t$ are tightened. Thus the work proceeds as the gland is successively forced down.

The absence of rubber in the interior or principal packing, A', avoids the possibility of any rubber coming in contact with the piston-rod; but the rubber in the exterior packing, B, performs its ordinary function, and when compressed swells inward, forcing the lubricated fiber A' into tighter and tighter contact with the piston-rod M. The rectangular form of the packing causes it to completely fill the stuffing-box at the commencement. This insures that the packing completely fills the space in the stuffing-box without waiting for the packing to become gradually shaped during the use.

I claim—

As a new article of manufacture, the soft cotton packing A', saturated as described, and the harder packing, B, composed largely of rubber or analogous elastic material, combined and arranged relatively to each other, and to the gland T and compressing means $t$, as herein specified.

In testimony whereof I have hereunto set my hand this 1st day of April, 1879, in the presence of two subscribing witnesses.

HERMAN W. WINANS.

Witnesses:
 H. A. JOHNSTON,
 E. D. STAFFORD.